United States Patent
Lee et al.

(10) Patent No.: US 7,546,745 B2
(45) Date of Patent: Jun. 16, 2009

(54) REFRIGERATOR AND DISPLAY DEVICE GUIDING APPARATUS OF THE SAME

(75) Inventors: Youn Seok Lee, Goyang-si (KR); Yang Gyu Kim, Seoul (KR); Joon Hwan Oh, Seoul (KR)

(73) Assignee: LG Electronics Inc., Seoul (KR)

( * ) Notice: Subject to any disclaimer, the term of this patent is extended or adjusted under 35 U.S.C. 154(b) by 707 days.

(21) Appl. No.: 11/209,736

(22) Filed: Aug. 24, 2005

(65) Prior Publication Data

US 2006/0118694 A1 Jun. 8, 2006

(30) Foreign Application Priority Data

Dec. 2, 2004 (KR) .................. 10-2004-0100663

(51) Int. Cl.
*F25B 49/00* (2006.01)
(52) U.S. Cl. .............. 62/125; 248/276.1; 248/371; 248/919; 312/405.1; 312/321.5; 361/681
(58) Field of Classification Search ............. 312/319.7, 312/321.5; 62/125; 248/923, 485, 371, 372.1, 248/276.1, 278.1, 919, 921, 922; 259/856; 361/681
See application file for complete search history.

(56) References Cited

U.S. PATENT DOCUMENTS

| | | | |
|---|---|---|---|
| 419,521 A * | 1/1890 | Heald et al. .................. 248/485 |
| 4,814,759 A | 3/1989 | Gombrich et al. | |
| 5,668,570 A * | 9/1997 | Ditzik .......................... 345/173 |
| 6,288,891 B1 * | 9/2001 | Hasegawa et al. ........... 361/681 |
| 6,692,093 B1 * | 2/2004 | Park et al. ................. 312/405.1 |
| 7,364,127 B2 * | 4/2008 | Huang ..................... 248/276.1 |
| 2004/0183326 A1 * | 9/2004 | Tegtmeier ..................... 296/62 |

FOREIGN PATENT DOCUMENTS

| JP | 8-098116 | 4/1996 |
|---|---|---|
| KR | 10-2000-0033709 | 12/2001 |
| KR | 2003 0083216 | 10/2003 |
| KR | 10-2004-0021741 | 3/2004 |

OTHER PUBLICATIONS

English Language Abstract of KR 10-2000-0033709.
U.S. Appl. No. 11/182,881 to Kim et al., filed Jul. 18, 2005.
English Language Abstract of JP 8-098116.
English Language Abstract of KR 2003-0083216.
English Language Abstract of KR 10-2004-0021741.

* cited by examiner

*Primary Examiner*—William E Tapolcai
(74) *Attorney, Agent, or Firm*—Greenblum & Bernstein, P.L.C.

(57) ABSTRACT

A display device guiding apparatus includes a receiving portion in which a display device can be received and a guide unit provided between the display device and the receiving portion. The guide unit includes a hinge assembly for pivoting the display at a predetermined angle, an arm assembly having first and second ends respectively connected to the hinge assembly and the receiving portion, and a pivot control unit providing a pivotal force of the arm assembly with respect to the receiving portion.

16 Claims, 13 Drawing Sheets

REFRIGERATOR AND DISPLAY DEVICE GUIDING APPARATUS OF THE SAME

This application claims the benefit of Korean Application No. 100663/2004 filed on Dec. 2, 2004, the entire disclosure of which is hereby incorporated by reference as if fully set forth herein.

BACKGROUND OF THE INVENTION

1. Field of the Invention

The present invention relates to a refrigerator and an apparatus for guiding the displacement of a display device installed on a door of the refrigerator. Particularly, the present invention relates to a display device guiding apparatus of a refrigerator, which can prevent a display device mounted on the refrigerator from interfering with an outer wall and other components of the refrigerator by preventing the display device from being inclined in a direction when the display device pivots rightward and leftward, thereby allowing the display device to be smoothly projected frontward. More particularly, the present invention relates to a refrigerator and a display device guiding apparatus of the refrigerator, which allow a user to watch the image displayed on the display device without suffering from or being subjected to a dead (i.e., unviewable) angle and view angle problems.

2. Description of the Related Art

A refrigerator includes a main body, a refrigerating compartment for storing food under a refrigeration state and a freezing compartment for storing food under a freezing state. The refrigerating and freezing compartments are defined in the main body and selectively opened and closed by refrigerating and freezing doors, respectively. The refrigerator is designed to generate cool air using refrigerant going through a series of processes such as compression, condensation, expansion, and evaporation processes. The cool air is supplied to the refrigerating and freezing compartments to lower the temperature therein.

In recent years, in order to improve the user's convenience, a water purifying system or a display device has been installed on the door.

The user can identify the current state such as the temperature and humidity state of the refrigerator through the display device. When a large-sized display device is installed on the door, the user can enjoy a variety of services such as the internet, TV and movie. Therefore, it will be more preferable for the user that a display device as large as possible is installed on the door.

Meanwhile, in order to install the display device on the door of the refrigerator, it is preferable that a flat display device such as a liquid crystal display (LCD) or a plasma display panel (PDP) that is relatively thin is used to prevent the insulation thickness of the door from being reduced. However, although the flat display device can solve the insulation thickness problem of the door, it may provide a dead angle at which the screen of the display device is hidden by, for example, a door handle and thus the user cannot see the image on the screen of the display device. Furthermore, since the flat display such as the LCD and PDP has an inherent view angle problem, the user can clearly watch the image on the screen within a predetermined angle range.

To solve the above problem, Korean Patent Application No. 10-2000-0033709 discloses a structure for installing the display device on the refrigerator. The structure is designed to pivot the display device up and down.

However, since a display device receiving portion must be curved in response to the pivotal angle of the display device, a thickness of the door is affected in relation to the size of the radius of the curved portion. When the depth of the receiving portion is increased, the insulating efficiency of the refrigerator is deteriorated. Therefore, an additional insulating member must be further installed.

Furthermore, since the pivotal hinges are formed on left and right sides of the display device, the pivot direction of the display device is limited in a vertical direction. Therefore, the view angle problem in the left and right directions and the dead angle problem caused by the door handle cannot be still solved.

SUMMARY OF THE INVENTION

Accordingly, the present invention is directed to a refrigerator and a display guiding apparatus of the refrigerator that substantially obviate one or more problems due to limitations and disadvantages of the related art.

An object of the present invention is to provide a refrigerator and a display device guiding apparatus of the refrigerator that can minimize a depth of a display device receiving portion and reduce the insulation loss of a refrigerator door.

Another object of the present invention is to provide a refrigerator and a display device guiding apparatus of the refrigerator that can solve the view angle problem of a display device in the left and right directions.

A further another object of the present invention is to provide a refrigerator and a display device guiding apparatus of the refrigerator that can solve a dead angle problem caused by, for example, a door handle.

A still further other object of the present invention to provide a display device guiding apparatus of a refrigerator, which can prevent a display device mounted on the refrigerator from interfering with an outer wall of the refrigerator and other components such as a door handle of the refrigerator by improving the straight advancement, thereby allowing the user to conveniently use the display device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a display device guiding apparatus comprising: a receiving portion in which a display device can be received; and a guide unit provided between the display device and the receiving portion. The guide unit comprises: a hinge assembly for pivoting the display at a predetermined angle; an arm assembly having first and second ends respectively connected to the hinge assembly and the receiving portion; and a pivot control unit providing a pivotal force of the arm assembly with respect to the receiving portion.

In another aspect of the present invention, there is provided a refrigerator comprising: a main body defining a lower temperature space; a door selectively sealing and opening the lower temperature space; a display device that can be received in the receiving portion; a receiving portion formed on the door; a display device that can be received in the receiving portion, and a guide unit is disposed between the display device and the receiving portion. The guide unit comprises: an arm assembly having first and second ends respectively connected to the display device and the receiving portion; and a hinge assembly for pivoting the display in vertical and horizontal directions.

In still another aspect of the present invention, there is provided a display device guiding apparatus comprising: a receiving portion for receiving a display device; and a guide unit disposed between the display device and the receiving portion. The guide unit comprises: a link assembly having an end fixed on the receiving portion to pivot in a vertical direction; and a hinge assembly controlling an angle of the display device.

In still yet another aspect of the present invention, there is provided a display device guiding apparatus of a refrigerator, comprising: a receiving portion formed on a refrigerator door to selectively receive a display device; a pivot control unit fixed on the receiving portion; an arm assembly having an end hinge-coupled to the fixing panel to pivot in a vertical direction; and a fixing bracket hinge-coupled to the arm assembly and to which the display device is fixed.

In still yet another further aspect of the present invention, there is provided a display device guiding apparatus of a refrigerator, comprising: a receiving portion formed on a refrigerator door to selectively receive a display device; a fixing panel fixed on the receiving portion; an arm assembly having an end hinge-coupled to the fixing panel to pivot in a vertical direction; and a spring supported between the arm assembly and the fixing panel.

In still yet another aspect of the present invention, there is provided a display device guiding apparatus of a refrigerator, comprising: a receiving portion formed on a refrigerator door to selectively receive a display device; and a plurality of links each having a first end connected to the receiving portion and a second end connected to the display device, wherein each of the links pivots in a vertical direction around the first end to pivot the display device in the vertical direction.

According to the present invention, the user can more conveniently and safely use the display device. In addition, the insulating loss caused by the installation of the display device can be reduced.

It is to be understood that both the foregoing general description and the following detailed description of the present invention are exemplary and explanatory only and are intended to provide further explanation of the invention as claimed.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings.

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

The following will explain, with reference to the above-described drawings, preferred embodiments of the present invention, in which like characters represent like elements. The particulars shown herein are by way of illustrative example of the embodiments of the invention only and are presented in the cause of providing what is believed to be the most useful and readily understood description of the principles and conceptual versions of the present invention. In this regard, no attempt is made to show structural details of the invention in more detail than is necessary for the fundamental understanding of the present invention, the description taken with the drawings making apparent to those skilled in the art how the several forms of the present invention may be embodied in practice.

First Embodiment

Figure 1:
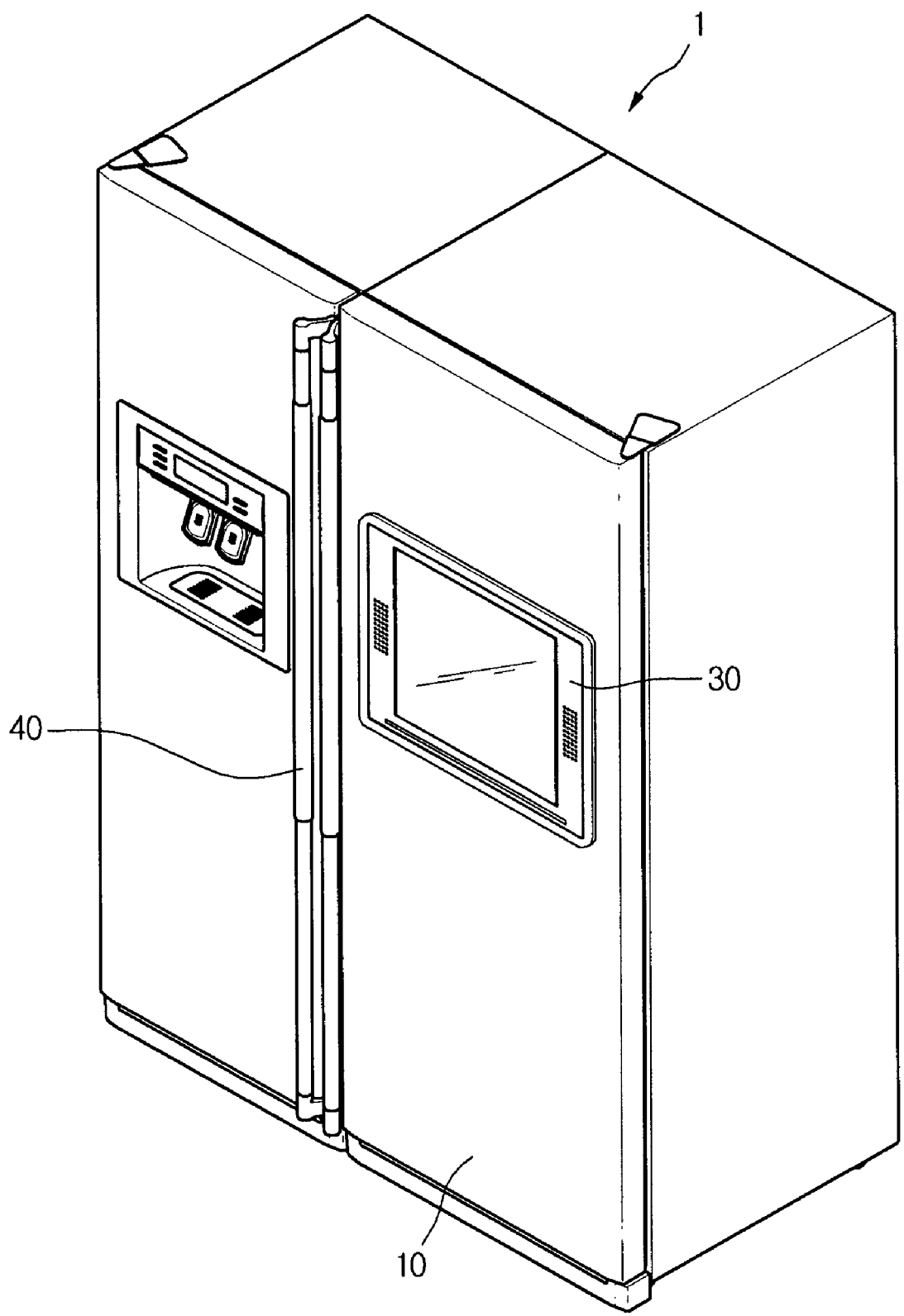
FIG. 1 is a perspective view of a refrigerator according to an embodiment of the present invention.

FIG. 1 shows a perspective view of a refrigerator according to an embodiment of the present invention.

Referring to FIG. 1, a refrigerator 1 includes a door movable for sealing or opening an inner space of the refrigerator 1, a display device 30 formed on a front surface of the door 10, and a door handle 40 used for opening and closing the door. While show in FIG. 1 is a side-by-side refrigerator, the present invention is also applicable to top-freezer and bottom-freezer type refrigerators as well as to any other type of home appliance including a display.

The user can more conveniently use the refrigerator using images displayed on the display device 30. The display device 30 may be used in a state where it is embedded in the door 10 or it is advanced frontward.

Therefore, a guide unit 200 is provided between the display device 30 and the door 10. When the display device 30 is advanced frontward by a predetermined distance and a predetermined angle, the view angle problem and the dead angle caused by the peripheral parts such as the handle 40 can be improved.

Figure 2:
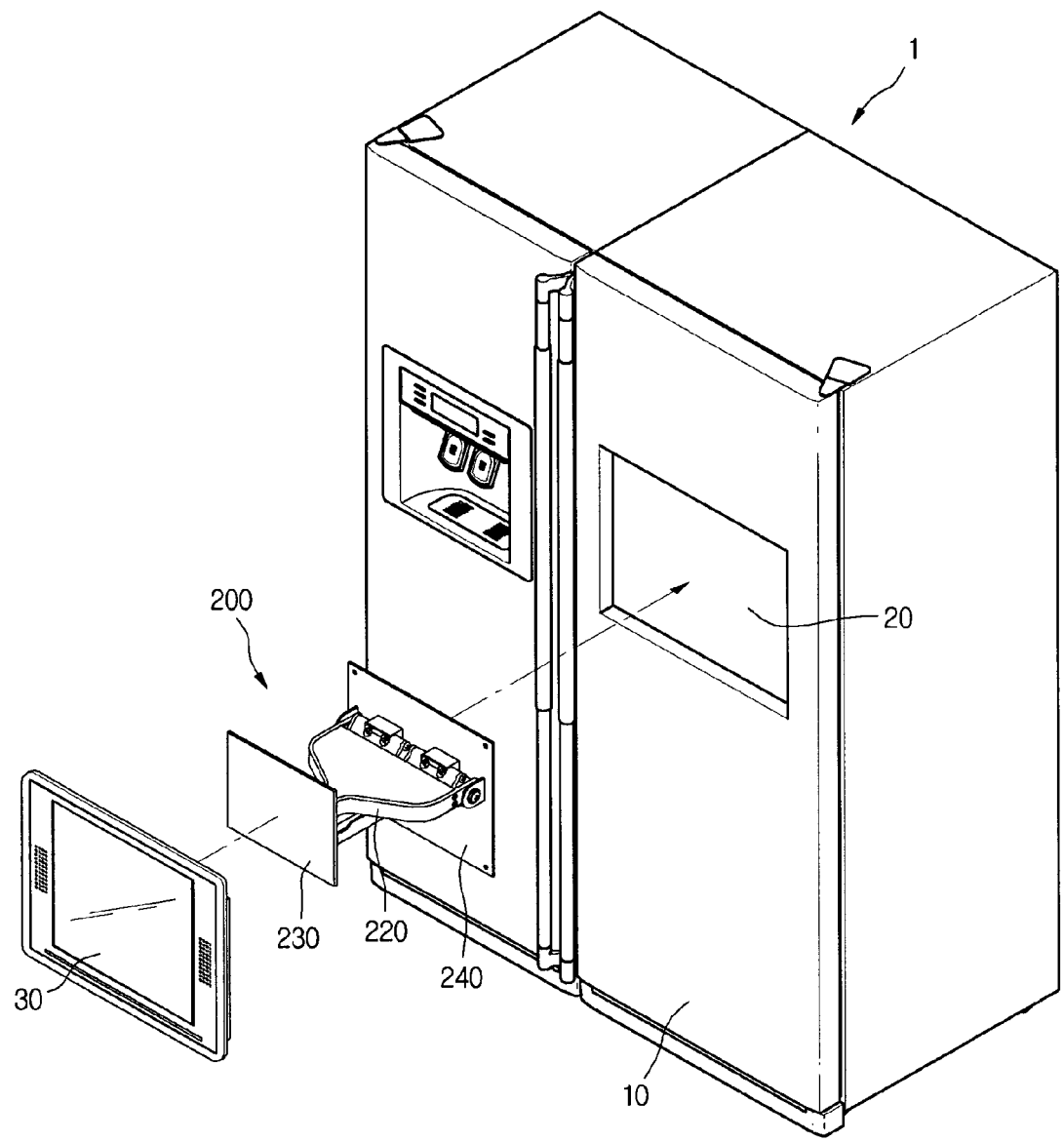
FIG. 2 is a perspective view of a refrigerator and a display device separated from each other according to a first embodiment of the present invention.

FIG. 2 shows a state where the display device is separated from the refrigerator.

Referring to FIG. 2, the door 100 of the refrigerator 1 is provided with a receiving portion 20 recessed by a predetermined depth. The guide unit 200 is mounted between the receiving portion 20 and the display device 30.

A fixing bracket 230 is disposed between the guide unit 200 and the display device 30. A fixing panel 230 is disposed between the guide unit 200 and the door 10. The fixing bracket 230 and/or the fixing panel 240 are not essential in the present invention. For example, opposite ends of the guide unit 200 may be directly fixed on the display device 30 and the door 10, respectively.

The guide unit 200 will be described in more detail hereinafter.

Figure 3:
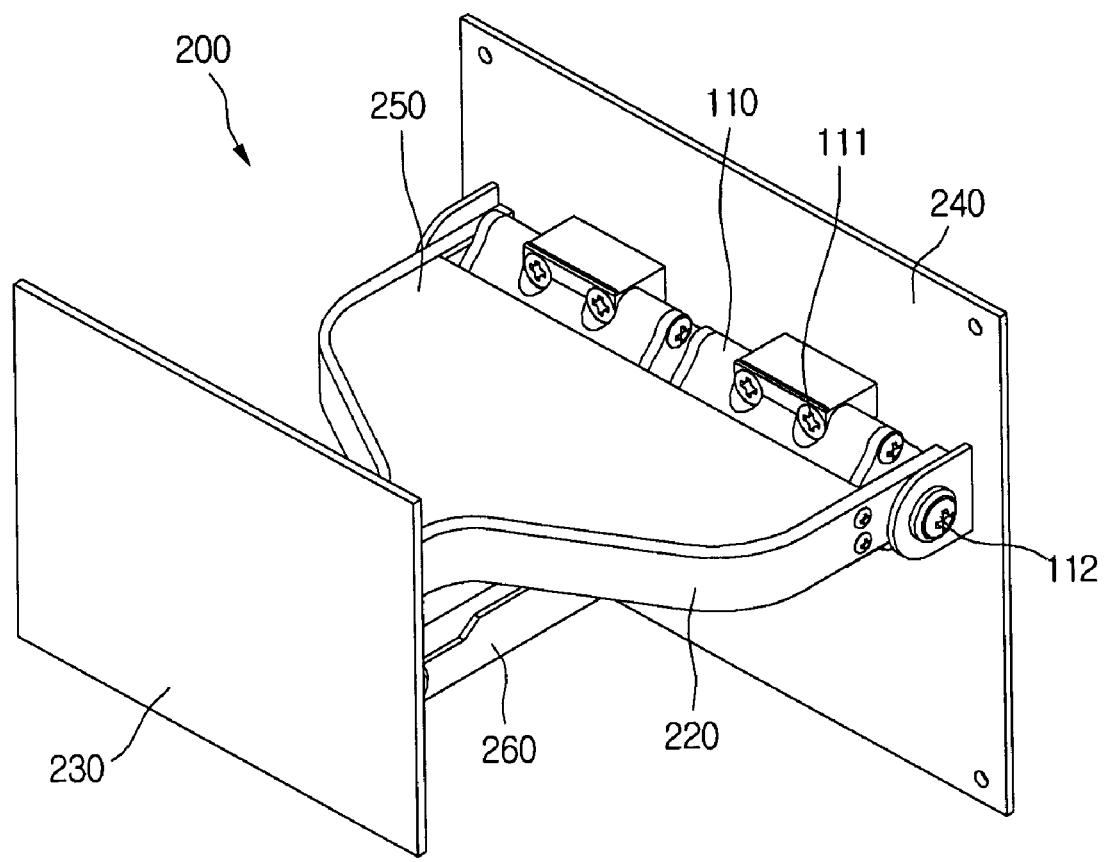
FIG. 3 is a front perspective view of a display device guiding apparatus according to a first embodiment of the present invention.
Figure 4:
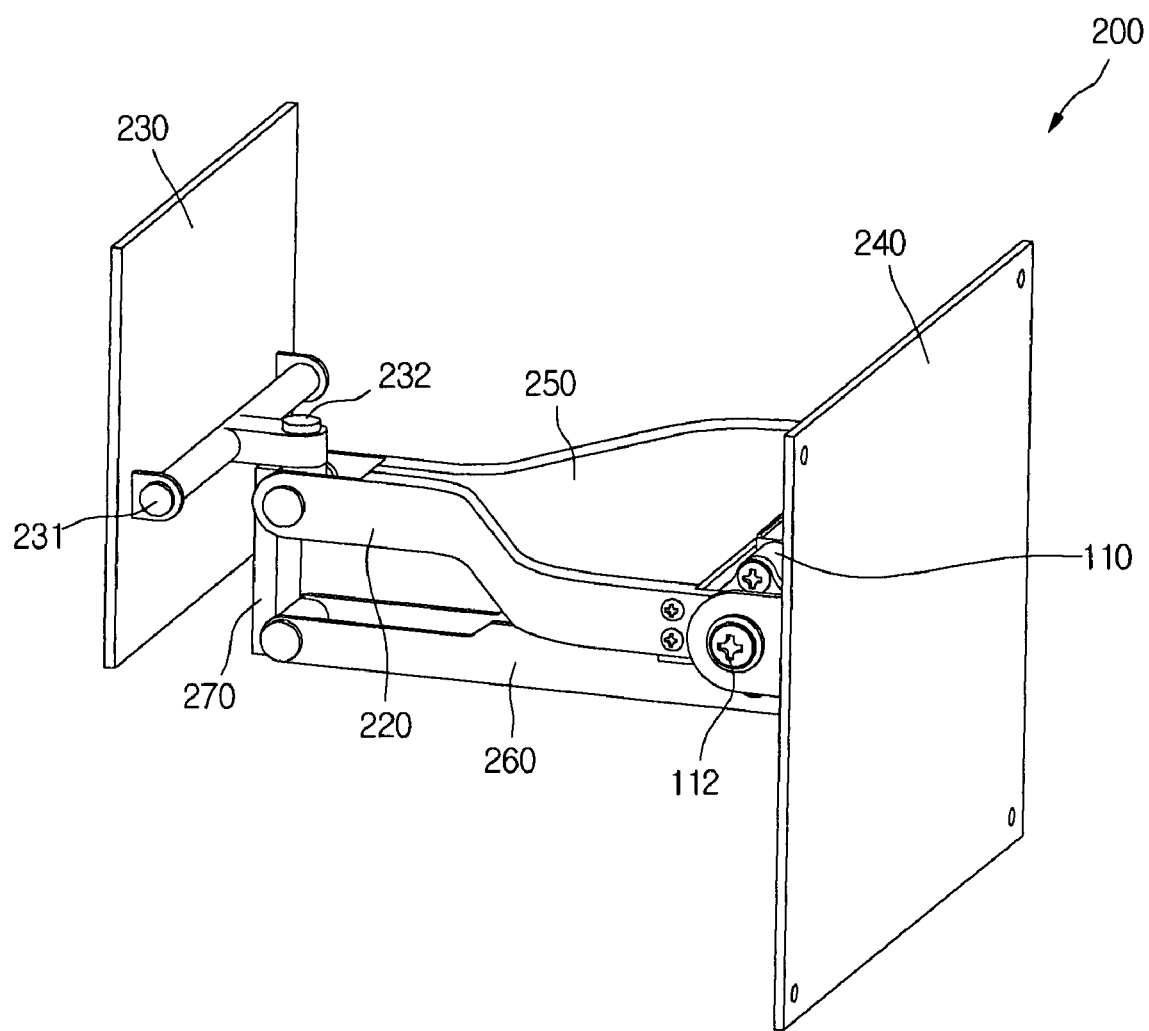
FIG. 4 is a rear perspective view of a display device guiding apparatus depicted in FIG. 3.

FIGS. 3 and 4 show a display device guiding apparatus according to an embodiment of the present invention.

Referring to FIGS. 3 and 4, the inventive guiding apparatus includes a guide unit 200, a fixing bracket 230, and a fixing panel 240. The guide unit 200 includes an arm assembly 220 disposed between the fixing bracket 230 and the fixing panel 240, a pivot control unit 100 connecting the arm assembly 220 to the fixing panel 240, and an arm assembly cover 250 covering a space defined by the arm assembly.

The fixing panel 240 is fixed on the door 10 and the pivot control unit 100 is fixed on the fixing panel 240. When the fixing bracket 230 is advanced frontward, the arm assembly 220 is pivoted around the pivot control unit 100. At this point, the pivot control unit 100 controls the pivotal motion of the arm assembly 220.

The above guiding apparatus will be described in more detail hereinafter.

The fixing bracket 230 has a front surface fixed on a back cover of the display device 30 and a rear surface connected to the arm assembly 220. A first hinge shaft 231 allowing the pivotal motion of the display device 30 in a vertical direction and a second hinge shaft 232 allowing the pivotal motion of the display device 30 in a horizontal direction are provided on a connection portion between the arm assembly 220 and the fixing bracket 230. By the first and second hinge shafts 231 and 232, the display device 30 can pivots in the vertical and horizontal direction at front ends of the arm assembly 220. A tightening unit providing operational friction to the display device 30 may be further provided.

In addition, a link 270 extends downward from the second hinge shaft 232. An upper portion of the link 270 is hinge-coupled to the arm assembly 220. An arm assembly support 260 may be connected to a lower portion of the link 270 to prevent the arm assembly 220 from excessively pivoting in the vertical direction. That is, the arm assembly support 260 has a front end hinge-coupled to the lower portion of the link 270 and a rear end hinge-coupled to the fixing panel 240.

In a state where a rear end of the arm assembly 220 is fixed on the pivot control unit 100 by screws 112, the arm assembly 220 pivots together with an operation part of the pivot control unit 100. Here, the pivot control unit 100 may be directly fixed on the receiving section 20. However, for the installing convenience, the pivot control unit 100 is fixed on the fixing panel 240 and the fixing panel 240 is fixed on the receiving section 20.

By the above-described structure, the arm assembly support 260, the arm assembly 220, the link 270, and the panel 240 are operated with a four-link articulated structure (i.e., a parallelogram linkage).

Describing in more detail, since the arm assembly 220, the link 270, the arm assembly support 260, and the panel 240 are hinge-coupled to one another, even when the arm assembly 220 and the arm assembly support 250 pivot in the vertical direction, the link always pivots at a vertical position (i.e., to remain parallel) with respect to the fixing panel 240. Therefore, no view angle problem appears on the display device 30 fixing on the fixing bracket 230. In addition, when the display device 30 pivots in a direction, it does not move in an undesired direction. That is, when the display device 30 is advanced frontward, it pivots around the pivot control unit 100 in a state where it maintains its vertical position. The arm assembly 220 includes a pair of right and left arms to stably support the display device against the self-gravity of the display device. The arm cover 250 is assembled between the right and left arms 221 and 222 to define a receiving space in which a power line and other input terminals are received without being exposed to an external side.

The pivot control unit 100 is provided to accurately control the pivot motion of the arm assembly 220. The pivot control unit 100 will be described in more detail hereinafter.

Figure 5:
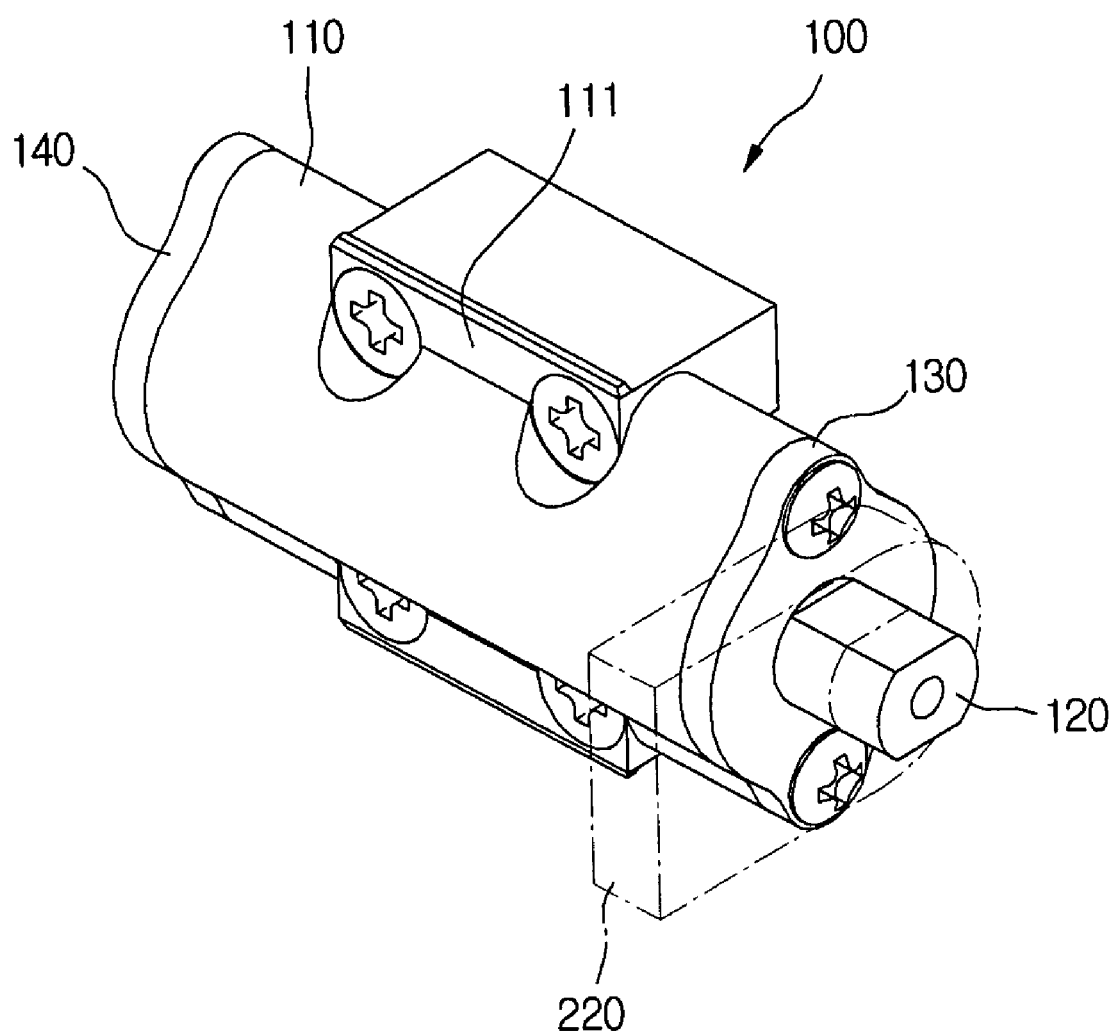
FIG. 5 is a perspective view of a pivot control unit of a display device guiding apparatus according to a first embodiment of the present invention.
Figure 6:
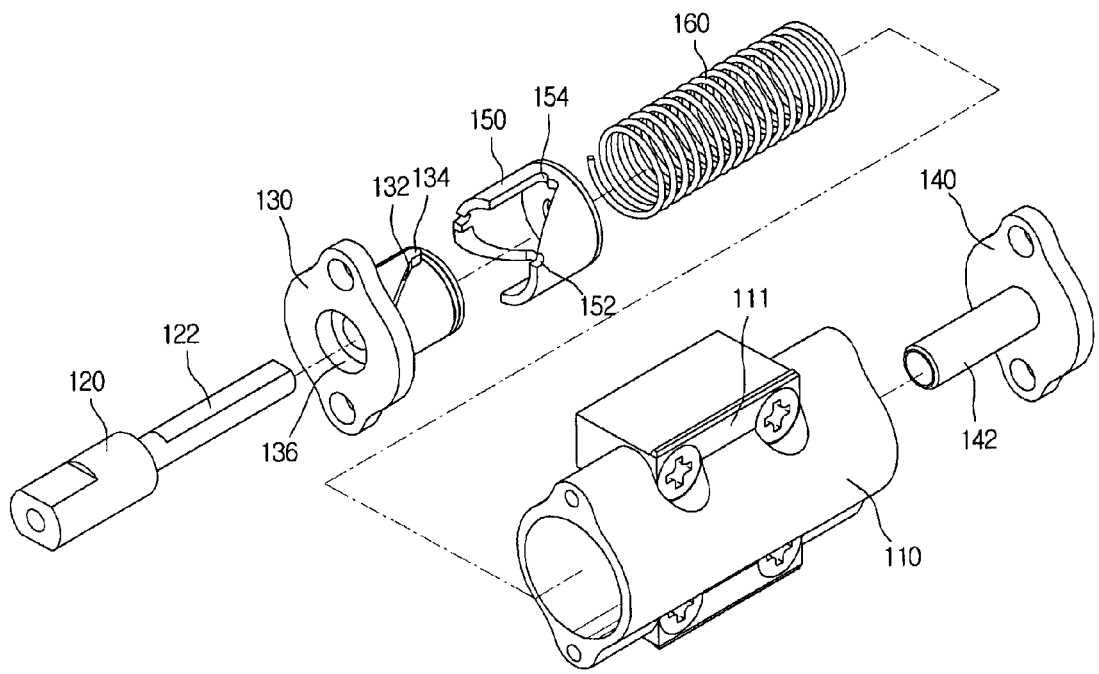
FIG. 6 is an exploded perspective view of a pivot control unit depicted in FIG. 5.

FIGS. 5 and 6 show the pivot control unit.

Referring to FIGS. 5 and 6, the pivot control unit 100 is installed on the panel 240 and the rear ends of the right and left arms 221 and 222 of the arm assembly 220 are fixed on the pivot control unit 100 by screws 112 (FIG. 4). Therefore, at least one end of the pivot control unit 100 pivots together with the pivotal motion of the arm assembly 220. Other portions of the pivot control unit 100 maintain their fixed states on the fixing panel 240. The pivot control unit 100 has at least two parts that are differently operated as described above.

As shown in FIG. 5, the pivot control unit 100 includes a cylindrical housing 110, a coupling portion 111 fixed on the panel 240 by screws, a rotational shaft 120 extending from a first end of the housing 110 to fix the arm assembly 220, a first cover 130 covering the first end of the housing 110, and a second cover 140 covering a second end of the housing 110.

In addition, as shown in FIG. 6, inserted in the housing are a rotational cam 150 rotating together with the rotational shaft 120 and a spring 160 biasing the rotational cam 150 in a direction.

The pivot control unit 100 will be described in more detail hereinafter.

The first and second covers 130 and 140 are assembled on the opposite ends of the housing 110. The first cover 130 is provided with a hole through which the rotational shaft 120 is inserted. A stationary cam 132 integrally extends from the first cover 130 in a direction where the rotational shaft 120 is inserted. The stationary cam 132 is provided at an outer circumference with a cam curve defined by depressing (or recessing) the outer circumference and projections 134 extending from the depressed cam curve.

The stationary cam 132 and the rotational cam 150 are disposed to correspond to each other, partly contacting each other. The rotational cam 150 is provided with a cam curve corresponding to the cam curve of the stationary cam 132. The cam curve of the rotational cam 150 is provided at opposite ends with first and second receiving grooves 152 and 154 corresponding to the projections 134 of the stationary cam 132.

In addition, an insertion portion of the rotational shaft 120 penetrates the first cover 130 and the rotational cam 150. The insertion portion is provided with a key surface 122 and the rotational cam 150 is provided at a distal end with a hole corresponding to the insertion portion of the rotational shaft 120. Therefore, when the rotational shaft 120 rotates, the rotational cam 150 rotates together therewith. Therefore, a shape of the insertion portion of the rotational shaft 120 is not limited to the above. That is, any shape that can allow the rotational shaft 120 and the rotation cam 150 to integrally rotate may be possible. For example, the insertion portion of the rotational shaft 120 may be formed in a polygonal shape or a star shape. Alternatively, the rotational shaft 120 and the rotational cam 150 may be fixedly coupled to each other by, for example, welding.

The spring 160 is supported on the second cover 140 to bias the rotational cam 150 toward the stationary cam 130. The spring 160 effectively applies the biasing force in a state where it is supported on the shaft 142 formed on the second cover 140. In order for the rotational shaft 120 to rotate in a state where it is inserted in the shaft 142, the shaft 142 may be formed as a hollow shaft.

Figure 7:
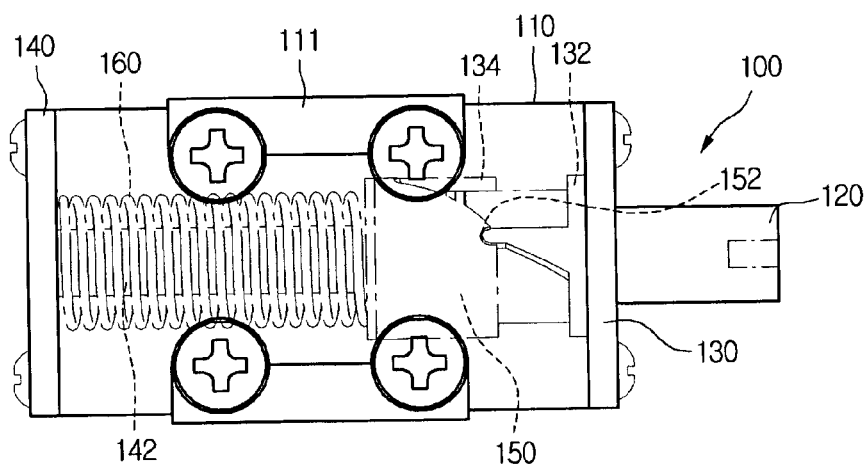
FIG. 7 is a front view of a pivot control unit depicted in FIG. 6 when a display device is received in a receiving portion.
Figure 8:
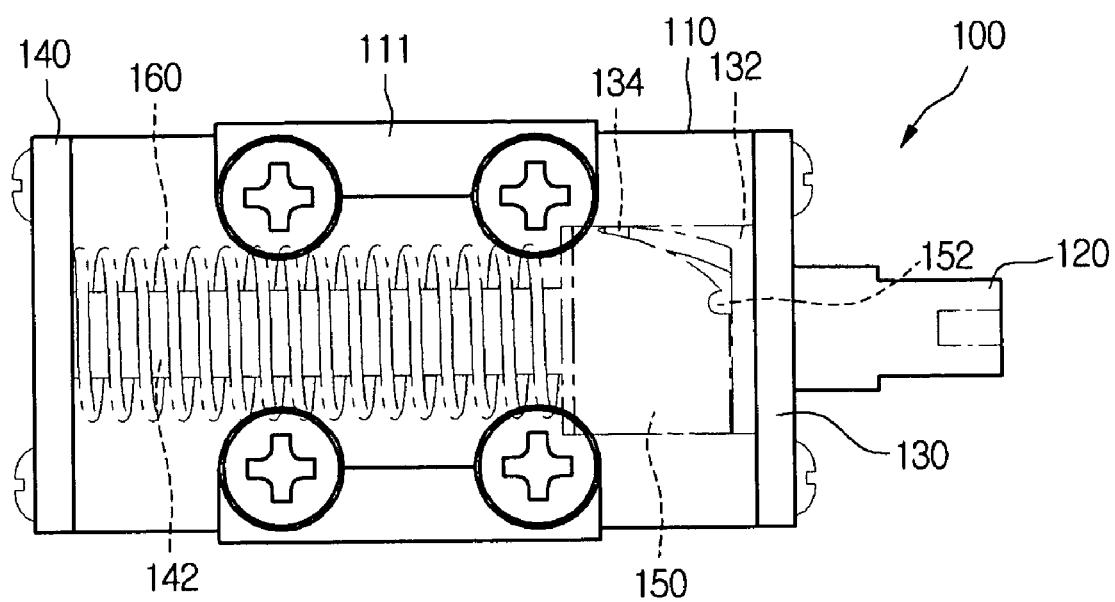
FIG. 8 is a front view of a pivot control unit depicted in FIG. 6 when a display device is advanced out of a receiving portion.

The operation of the pivot control unit 100 will be described in more detail hereinafter with reference to FIGS. 7 and 8.

When the display device 30 is advanced frontward from the receiving portion 20, the pivot shaft 120 rotates by the arm assembly 220. At this point, since the pivot shaft 120 is provided with the key surface 122, the rotational cam 150 rotates together with the pivot shaft 120. The rotation of the rotational cam 156 is guided by the cam curve formed on the stationary cam 150.

That is, the projections 134 formed on the stationary cam 132 are guided from the first receiving groove 152 of the rotational cam 150 to the second receiving groove 154. To realize this, it is preferable that the projections 134 are formed corresponding to the first and second receiving grooves 152 and 154 and a connection line between the first and second receiving grooves 152 and 154 are formed with a smooth curve. When the projections 134 are moving, since the spring 160 applies tensioning force toward the rotational cam 150, the projections 134 can be easily moved to the second receiving groove 154 once it is released from the first receiving groove 152 even when the user does not apply any force to the display device.

When the display device is received in the receiving portion 20, the rotational shaft 120 rotates in the opposite direction, thereby moving the projections 134 from the second receiving portion 154 to the first seating portion.

The operation of the display device guiding apparatus for the refrigerator according to the present invention will be described hereinafter in more detail.

Figure 9:
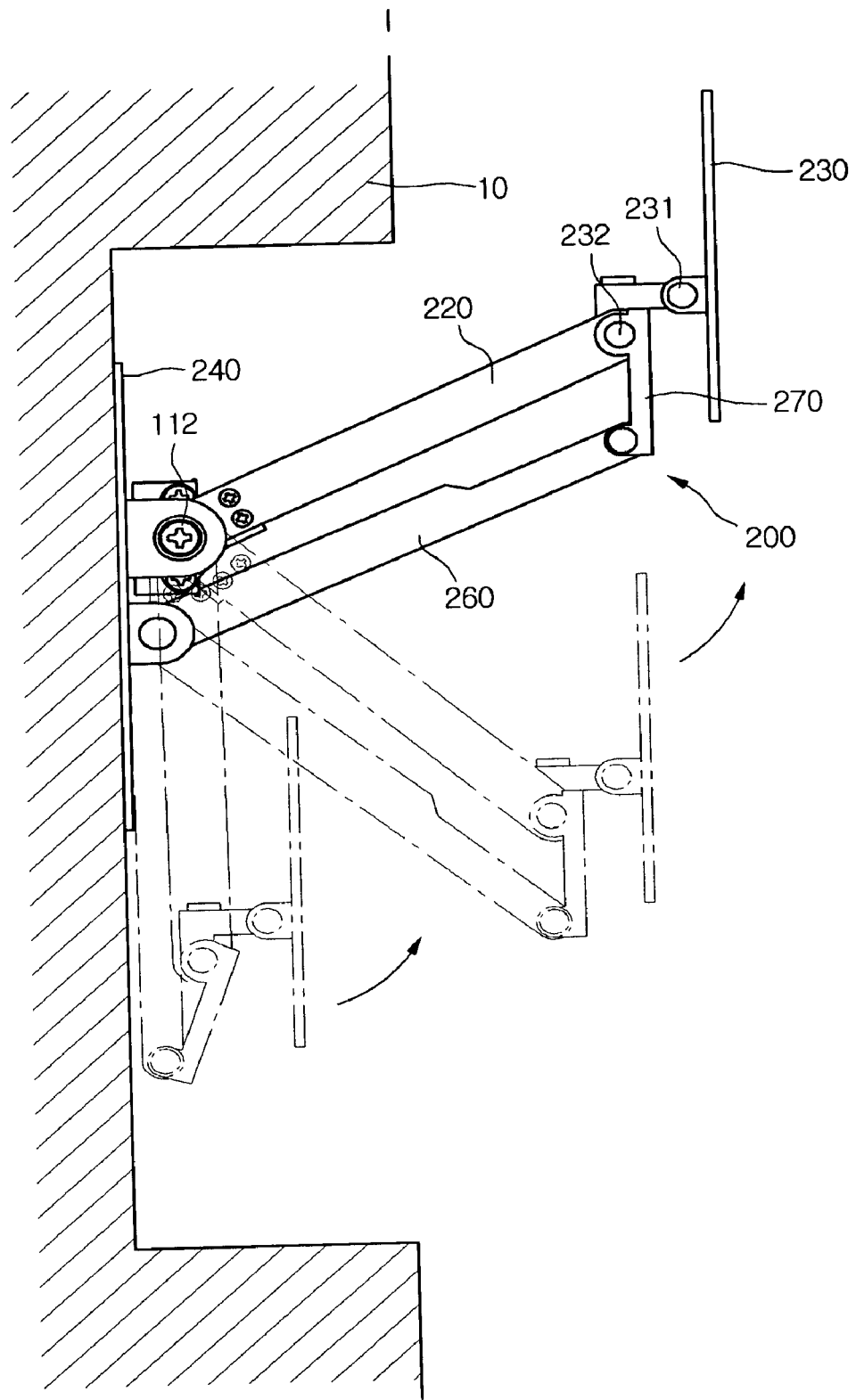
FIG. 9 is a view illustrating a state where a display device is being advanced frontward out of a receiving portion by a display device guiding apparatus according to a first embodiment of the present invention.

FIG. 9 shows the advancing operation of the display device by the inventive display device guiding apparatus.

Referring to FIG. 9, the guide unit 200 is received in the receiving portion 20 recessed in the front surface of the door 10. The fixing panel 240 is fixed on the inner surface of the receiving portion 20 and the display device is fixed on the fixing bracket 230. A flat display device such as an LCD or PDP may be used as the display device.

The initial state of the guide unit 200 installed on the receiving portion 20 is that the display device 30 is completely received in the receiving portion 20 (see phantom line). In this state, when the user pulls the display device 30 frontward, the display device 30 pivots upward around the pivot shaft 120 installed on the pivot control unit 100.

Describing in more detail, when the user pulls the display device frontward from the receiving portion 20 of the door 10, the pivot shaft 120 rotates by the arm assembly 220 connected to the fixing bracket 230 fixed to the display device 30. When the pivot shaft 120 rotates, the rotational cam 150 rotates together therewith by the key surface 122 formed on the pivot shaft 120.

When the rotational cam 150 rotates, the projections 134 of the stationary cam 132, which are received in the first receiving groove 154, is released out of the first receiving groove 154. As a result, the rotational cam 150 moves along the cam curve of the stationary cam 132 integrally formed on the first cover 130. At this point, since the rotational cam 150 is biased frontward by the spring 160, the movement of the rotational cam 150 can be smoothly realized. Therefore, in view of this, even when the user does not apply any force to the display device 30, the display device can be advanced frontward by the biasing force of the spring 160.

The rotation of the pivot shaft 120 is stopped when the projection 134 formed on the stationary cam 132 is received in the second receiving groove 154 formed on the rotational cam 150 and the arm assembly 220 connected to one end of the pivot shaft 120 and the fixing bracket 230 are to be disposed on an identical plane.

Figure 10:
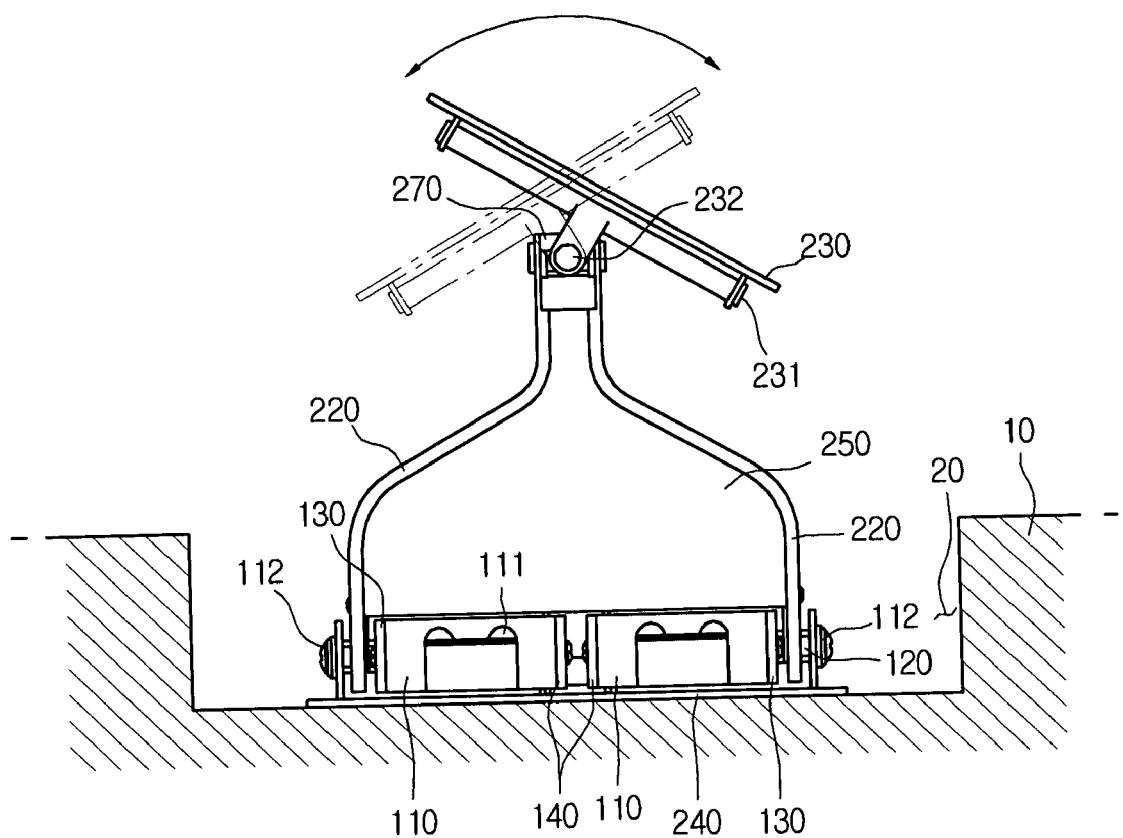
FIG. 10 is a view illustrating a pivot motion of a display device guiding apparatus according to a first embodiment of the present invention.

As described above, when the arm assembly 220 and the fixing bracket 230 are disposed on the same plane, the user can adjust the vertical angle of the display device 30 by pivoting the display device 30 around the first hinge shaft 231. In addition, as shown in FIG. 10, the user can adjust the horizontal angle of the display device 30 by pivoting the display device around the second hinge shaft 231. The hinge shafts 231 and 232 may be provided with predetermined friction portions so that the adjusted angle of the display device can maintained.

Meanwhile, when it is intended to receive the display device into the receiving portion, the user pivots the display device 30 downward, by which the arm assembly 220 rotates the pivot shaft 120.

As the pivot shaft 120 rotates, the rotational cam 150 moves along the cam curve as the projection 134 of the stationary cam 132 is released from the second receiving groove 154 of the rotational cam 150. When the projection 134 of the fixing cam 132 is received in the first receiving groove 152 of the rotational cam 150, the display device 30 is to be completely received in the receiving portion 20 of the door 10.

As described above, the display device guiding apparatus can be effectively used when the user intends to more clearly watch the images displayed on the display device when there is the dead angle problem and the view angle problems in a state where the display device 30 is received in the receiving portion 20 of the door 10.

In addition, when it is intended to advance and receive the display device from and in the receiving portion, the display device can be easily advanced and received by the spring 160 installed in the pivot control unit 100 even when the user does not excessively apply the force.

In addition, since the display device pivots in a state where it faces forward, it is convenient for the user to adjust the view angle of the display device.

Furthermore, after the display device 30 is fully advanced frontward, since the user can easily adjust the angle of the display device in both the vertical and horizontal direction, the user can clearly watch the images displayed on the display device under any conditions.

The mounting locations of the hinge shafts 231 and 232 and the shapes of the arm assembly 220 and the cams 132 and 150 are not limited to the embodiment but can be modified.

In addition, when the number of receiving grooves 152 and 154 are increased, the position of the display device can be more variably adjusted. The mounting location and shape of the spring 160 can be also modified.

Second Embodiment

This embodiment is substantially identical to the first embodiment except for the structure of the guide unit. Therefore, the description of the same parts will be omitted herein.

Figure 11:
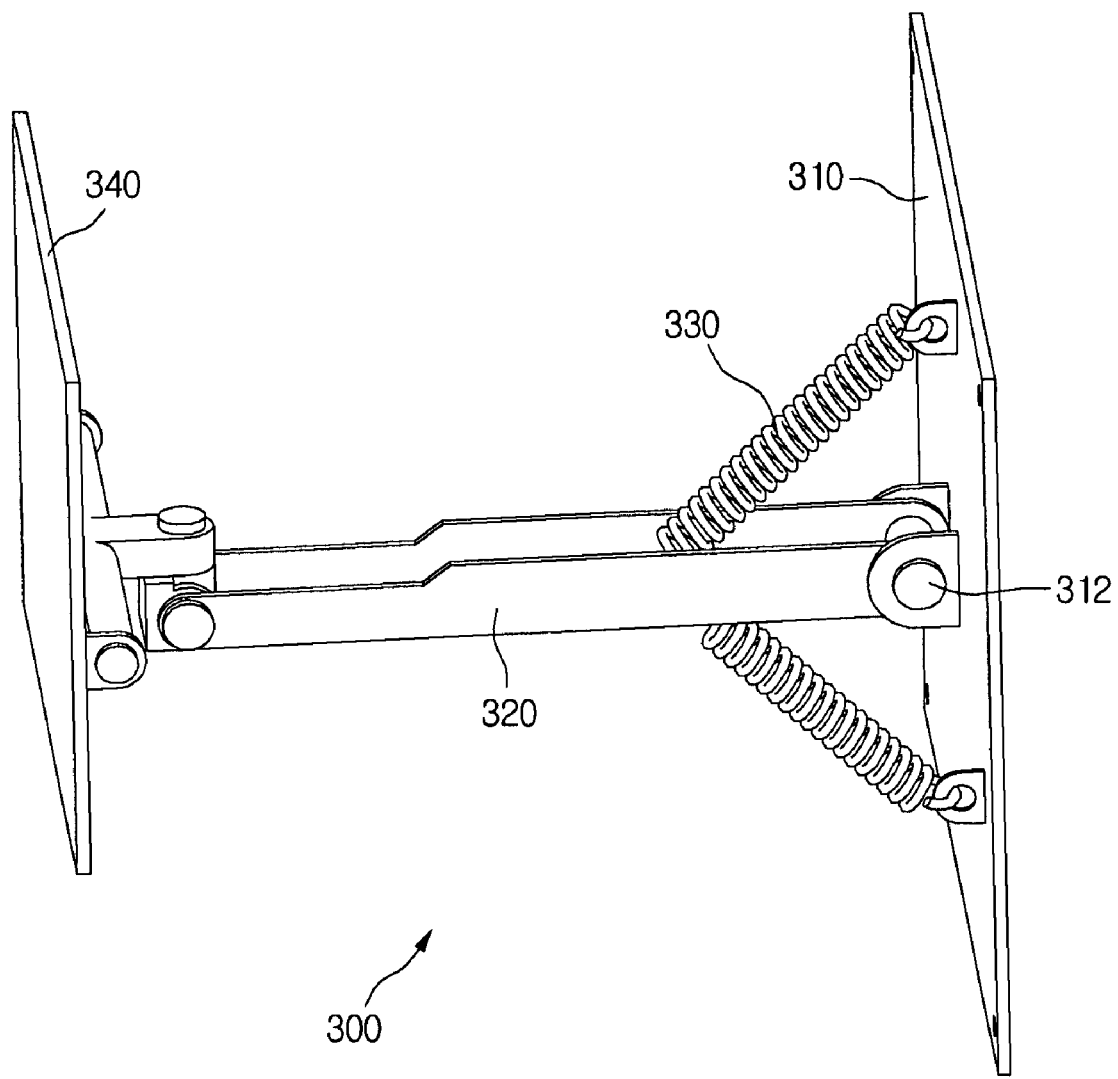
FIG. 11 is a perspective view of a display device guiding apparatus according to a second embodiment of the present invention.

FIG. 11 shows a display device guiding apparatus according to a second embodiment of the present invention.

Referring to FIG. 11, a display device guiding apparatus according to this embodiment includes a fixing panel 310 fixed on the door, a fixing bracket 340 to which the display device is fixed, and a guide unit 300 interconnecting the fixing panel 310 and the fixing bracket 340. The guide unit 300 includes an arm assembly having opposite ends respectively hinge-coupled to the fixing panel 310 and the fixing bracket 340 and a spring 330 biasing the arm assembly 320 in a rotational direction.

A push button switch assembly is installed on a back cover of the display device 30 and the receiving portion 20 of the door 10 to maintain the initial state where the display device 30 is received in the receiving portion 20 of the door 10. The push button switch assembly includes a hook (refer to the reference numeral 41 of FIG. 12) and a catch (refer to the reference numeral 42 of FIG. 12), at a position corresponding to the hook 41. Therefore, when the display device 30 is received in the receiving portion 20 of the door 10, the hook 41 is interlocked with the catch 42 to maintain the received state of the display device 30. The locations of the hook and the catcher are not limited to this case. It will be sufficient for these two members to be respectively formed on a moving part and a stationary part. For example, the hook 41 may be provided on the arm assembly 320 while the catcher 42 is provided on the receiving portion 20. A variety of other modifications will be also possible.

The push button switch assembly is differently operated according to the number of insertions of the hook 41 into the catch 42. For example, in a state where the hook 41 is interlocked with the catch 42, when the hook 41 is pushed once, the interlocking is released to allow the display device 30 to be advanced frontward. Then, when the hook 41 is pushed into the catch 42 again, the hook 41 is interlocked with the catcher 42. Of course other types of catch or latch mechanisms can also be used. Additionally, it is understood that a similar switch assembly can be used in the first embodiment of the present invention.

The tension spring 330 disposed between the fixing panel 310 and the arm assembly 320 is provided on at least one of upper and lower portions of the arm assembly 320.

The tensions of the springs 330 are properly adjusted at the upper and lower portions of the arm assembly 320 so that the display device can be effectively stopped by its self-gravity (or weight) and the tension of the springs.

Figure 12:
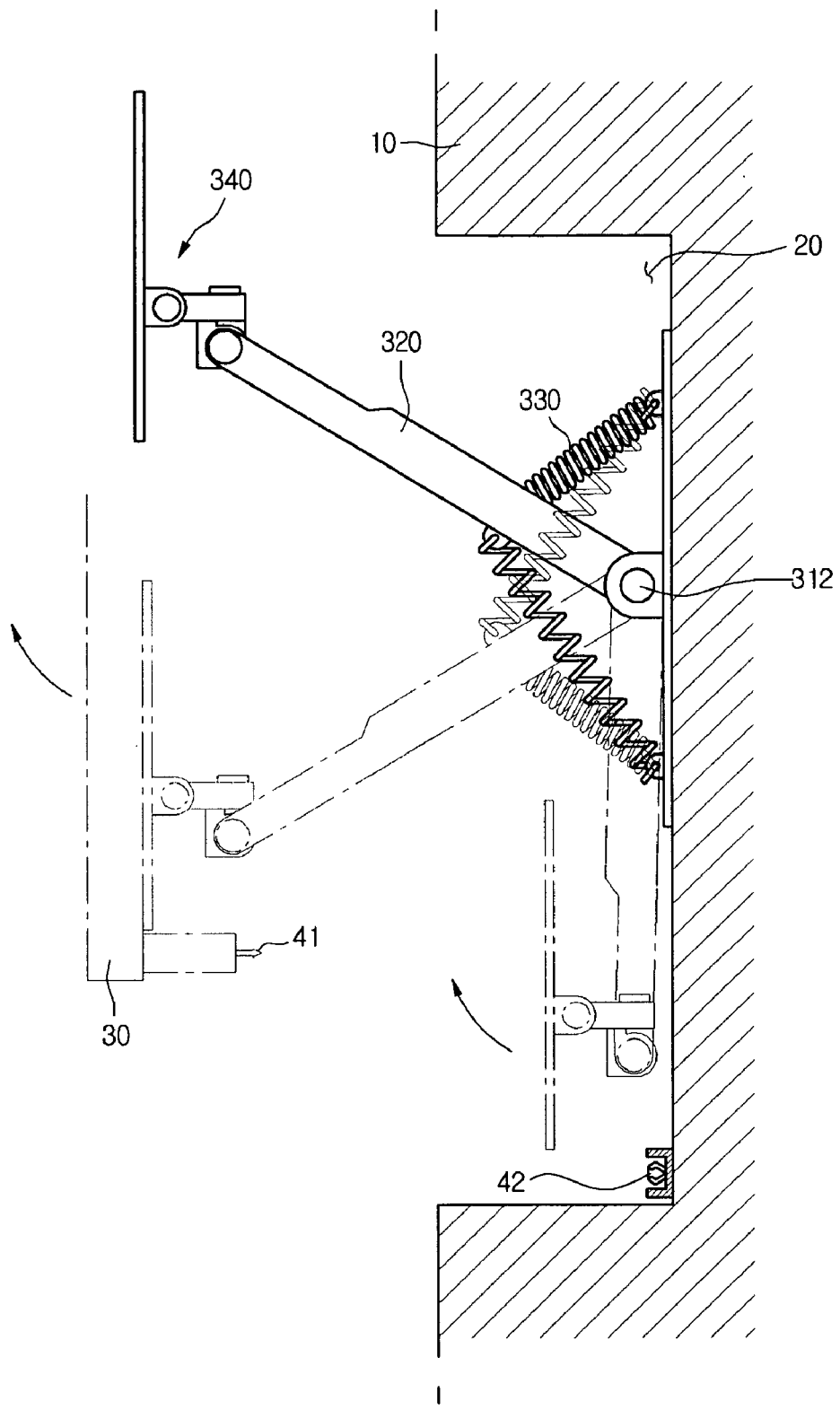
FIG. 12 is a view illustrating an operation of a display device guiding apparatus according to a second embodiment of the present invention.

FIG. 12 illustrates the operation of this second embodiment.

In a state where the display device is received in the receiving portion 20, when the push button switch assembly is pushed, the arm assembly 320 pivots upward by the spring 330. Then, in a location where the tension of the spring 330 becomes identical to the self-gravity or weight of the display device, the display device 30 is stopped. In this embodiment, by providing the hinge shafts 231 and 232, the display device 30 changes its disposition angle in a desired direction, thereby eliminating the dead angle problem as well as the view angle problem.

On the contrary, when it is intended to receive the display device 30 into the receiving portion 20, the display device 30 pivots around the hinge shaft 312 so that the push button switch can be interlocked.

According to the present invention, by the fixing bracket fixed on the receiving portion, the arm assembly fixed on the fixing bracket and the spring installed between the arm and the receiving portion, the guide unit of this embodiment can be identically operated to that of the first embodiment where the pivot control unit is installed.

That is, with a very simple structure to which the arm assembly is provided, the display device can be conveniently advanced from and received in the receiving portion.

Third Embodiment

This embodiment is substantially identical to the first embodiment except that this embodiment has a feature where the display device can be effectively advanced frontward while overcoming the self-gravity. Therefore, the parts identical to those of the first embodiment will not be described herein.

Figure 13:
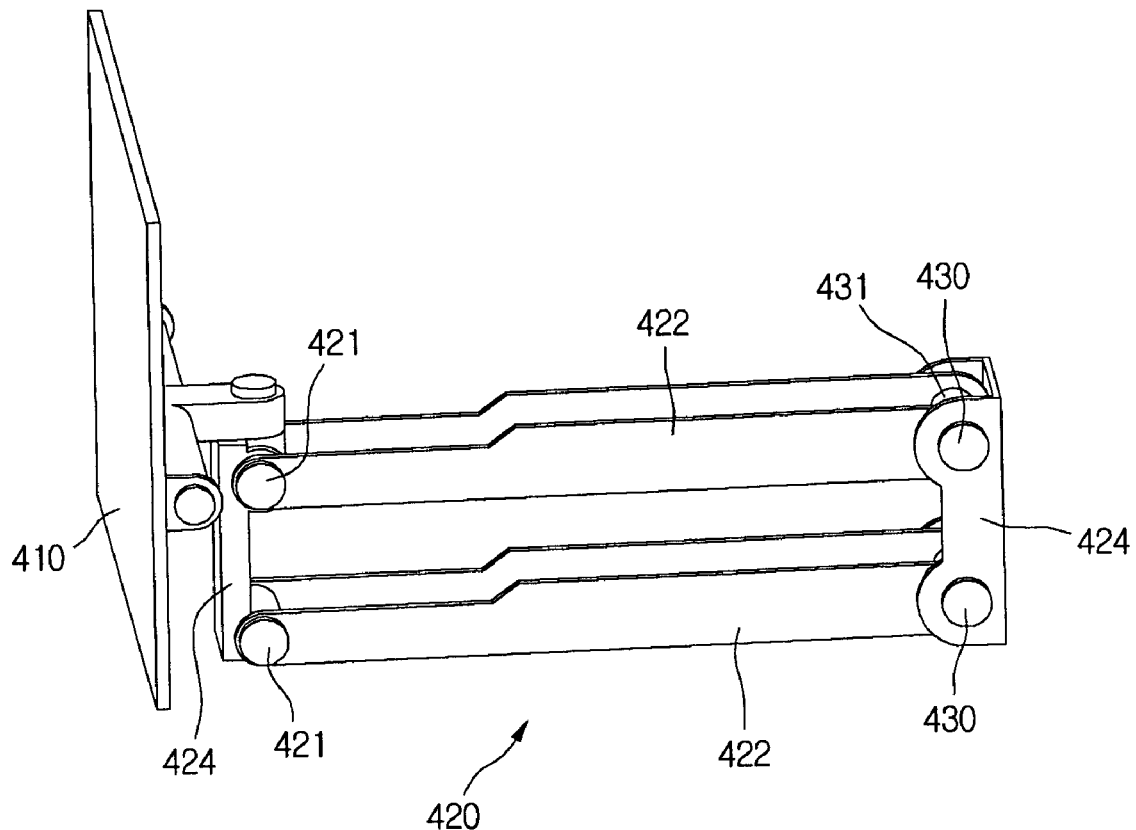
FIG. 13 is a perspective view of a display device guiding apparatus according to a third embodiment of the present invention.
Figure 14:
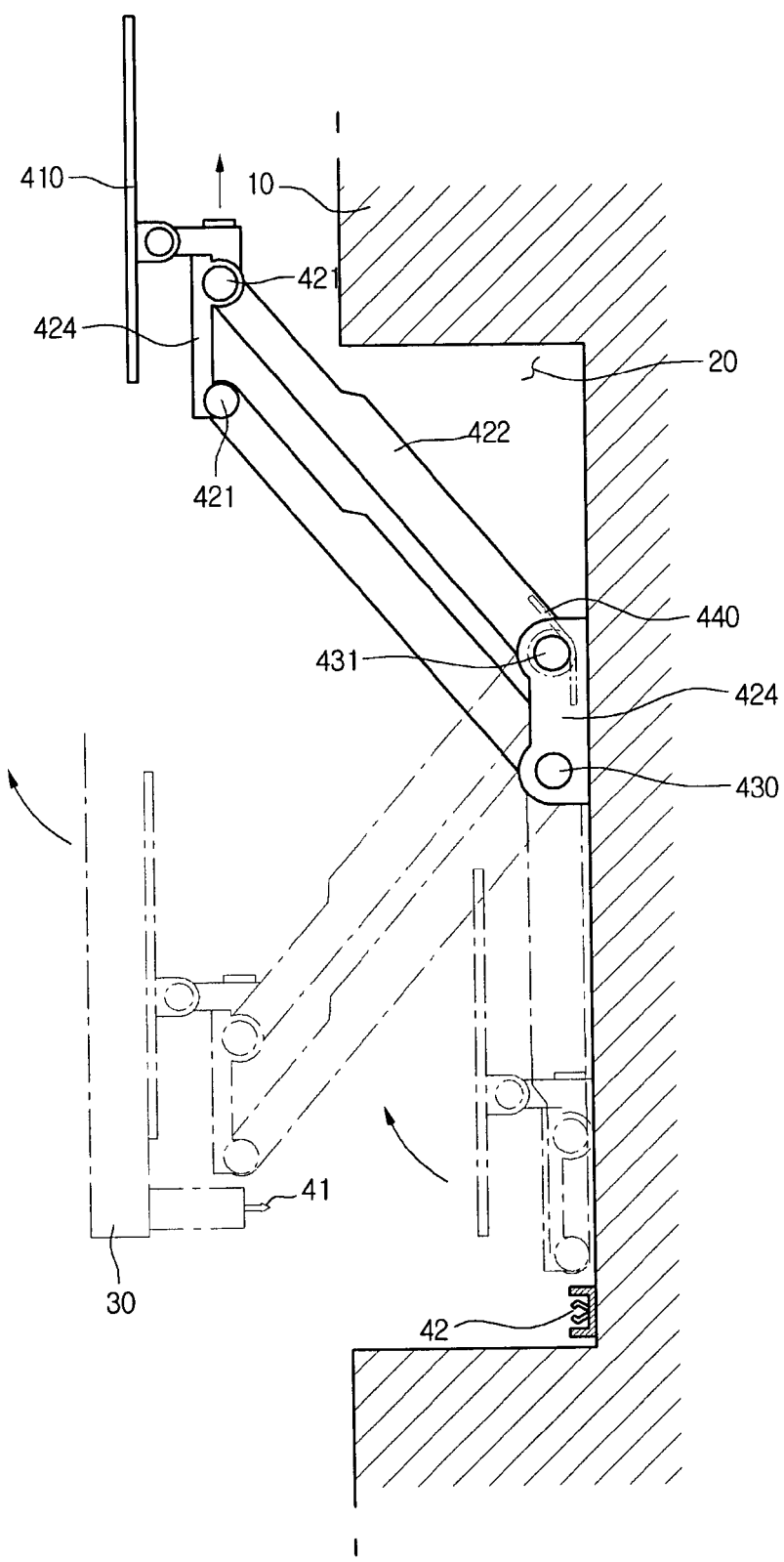
FIG. 14 is a view illustrating an operation of a display device guiding apparatus according to a third embodiment of the present invention.

FIGS. 13 and 14 show a display device guiding apparatus according to a third embodiment of the present invention.

Referring to FIG. 13, a back cover of a display device 30 is installed on a front surface of a fixing bracket 410 pivotable in multiple directions. A four-link articulated structure 420 is installed in a rear surface of the fixing bracket 410.

The articulated structure 420 includes a pair of parallel horizontal bars 422 having first and second ends respectively connected to a pair of vertical bars 424 by coupling screws 421 and 430. One of the vertical bars 424 is installed in a receiving portion 20 of a door 10.

A torsion spring 440 is installed on a hinge shaft 431 of the vertical bar 424 fixed in the receiving portion 20. In order to maintain an initial state where the display device 30 is fully received in the receiving portion 20, a push button switch is provided. The push button switch includes a hook 41 and a catch 42. The torsion spring applies its biasing force in a direction where the display device 30 is advanced frontward from the receiving portion 20 (in a rotation direction of the horizontal bar 422). Of course the torsion spring (or another type of spring) can be installed on any of the other hinge shafts of the articulated structure 420.

In operation, in a state where the display device is received in the receiving portion 20, when the push button switch assembly is pushed, the locking state of the push button switch is released and the display device is automatically advanced frontward from the receiving portion by the torsion spring installed on the hinge shaft 431.

The display device 30 advanced frontward from the receiving portion 20 of the door 10 can be pivoted in the vertical and horizontal directions around hinge shafts so as to provide the clearer image to the user.

On the contrary, when it is intended to receive the display device 30 into the receiving portion 20, the display device 30 pivots around the hinge shaft 431 so that the push button switch can be interlocked. That is, the vertical bars 424 and the horizontal bares 422 are overlapped with one another, thereby making it possible to minimize the depth of the receiving portion.

According to the present invention, the display device can be easily advanced from the receiving portion and adjusted to provide an optimal view angle and eliminate the dead angle, thereby providing the clearer image to the user.

When the display device is advanced from the receiving portion, since it can be advancing with a stable speed, the damage of the display device can be prevented in advance.

Since the depth of the receiving portion can be minimized, the insulation loss of the door can be reduced.

Since the inventive display device guiding apparatus is designed to prevent the display device from interfering with other peripheral parts, it will be more effective to apply the same to the refrigerator door with a handle.

In addition, when the friction member disposed between the links to provide frictional force to the hinge shafts functions well, the operation will be reliably done even when there is no spring biasing the display device in a pivotal direction.

It will be apparent to those skilled in the art that various modifications and variations can be made in the present invention. Thus, it is intended that the present invention covers the modifications and variations of this invention provided they come within the scope of the appended claims and their equivalents.

For example, the feature of the present invention can be preferably applied to a case where the display device is installed on the door of the refrigerator. However, the concept of the present invention can be applied to other electronic devices associated with the display device.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. The present teachings can be readily applied to other types of apparatuses. Changes may be made, within the purview of the appended claims, as presently stated and as amended, without departing from the scope and spirit of the present invention in its versions. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims. Alternative structures discussed for the purpose of highlighting the invention's advantages do not constitute prior art unless expressly so identified. No one or more features of the present invention are necessary or critical unless otherwise specified.

What is claimed is:

1. A display device guiding apparatus of a refrigerator, comprising:
    a receiving portion in which a display device can be received, the receiving portion being positioned in front of a door of the refrigerator; and
    a guide unit provided to enable the display device to move in at least one or all of an upward direction, a downward direction, a forward direction and a rearward direction, and to pivot, with the display device being connected to the receiving portion,
    wherein the guide unit comprises:
    a hinge assembly for pivoting the display at a predetermined angle;
    an arm assembly having first and second ends respectively connected to the hinge assembly and the receiving portion; and
    a pivot control unit providing a pivotal force to move the arm assembly with respect to the receiving portion, the hinge assembly, arm assembly, and pivot control unit being completely stored within the receiving portion when the display device is received in the receiving portion,
    wherein the display device is configured to move up and down while maintaining the display device in a vertical orientation.

2. The display device guiding apparatus according to claim 1, wherein the arm assembly pivots in a vertical direction about a hinge point of the receiving portion to move the display device up and down while maintaining the display device in a vertical orientation.

3. The display device guiding apparatus according to claim 1, wherein the hinge assembly comprises:
    a first hinge rotatable in a horizontal direction; and
    a second hinge rotatable in a vertical direction.

4. The display device guiding apparatus according to claim 1, further comprising a fixing bracket having a rear surface to which the hinge assembly is connected and a front surface to which the display device is fixed.

5. The display device guiding apparatus according to claim 1, wherein the arm assembly includes a pair of arms.

6. The display device guiding apparatus according to claim 1, wherein the pivot control unit comprises:
    a housing fixed on the receiving portion;
    a pivot shaft installed in the housing and having a first end attached to the arm assembly;
    a rotational cam rotating together with the pivot shaft and provided with a cam surface;
    a stationary cam corresponding to the rotational cam;
    a first cover supporting the stationary cam and fixed on a first end of the housing;
    a second cover fixed on a second end of the housing; and
    a spring biasing the rotational cam.

7. The display device guiding apparatus according to claim 6, wherein the rotational cam is provided with a plurality of receiving grooves and the stationary cam is provided with at least one projection associated with the receiving groove,
    wherein when the at least one projection is separated from one of the plurality of receiving grooves, the display device automatically moves up by elasticity of the spring until the arm assembly becomes substantially horizontal, and the projection is mounted on another one of the plurality of receiving grooves.

8. The display device guiding apparatus according to claim 6, wherein the rotational cam and the stationary cam are configured to stop the display device at a plurality of locations.

9. The display device guiding apparatus according to claim 1, further comprising:
    a link rotatably connected to the first end of the arm assembly; and
    an arm assembly support, one end being rotatably connected to the link and the other end being rotatably connected to the receiving portion,
    wherein the arm assembly, the link, the arm assembly support, and the receiving portion configure a four link articulated structure.

10. The display device guiding apparatus according to claim 1, further comprising:
    a push button switch for selectively fixing the display device on the receiving portion, the push button switch including a hook which is provided on one of a rear portion of the display device and a front portion of the receiving portion, and a catcher which is provided on the other of the rear portion of the display device and the front portion of the receiving portion for selectively coupling the hook, wherein the pivot control unit includes a pair of springs connecting the arm assembly and the receiving portion.

11. The display device guiding apparatus according to claim 10,
wherein an end of one of the springs is connected at a position higher than the hinge point of the arm assembly, and an end of the other of the springs is connected at a position lower than the hinge point of the arm assembly,
and wherein the one of the springs has elasticity to pull the arm assembly, and the other of the springs has elasticity to push the arm assembly.

12. The display device guiding apparatus according to claim 9, wherein the pivot control unit includes a torsion spring on a coupling portion of the arm assembly and the receiving portion.

13. A refrigerator comprising:
a main body defining a low temperature space having a temperature maintainable below ambient temperature;
a door selectively sealing and opening the lower temperature space;
a receiving portion formed on the door; and
a display device that can be received in the receiving portion;
a guide unit provided to enable the display device to move vertically and horizontally, and to pivot, with the display device being connected to the receiving portion,
wherein the guide unit comprises:
a hinge assembly for pivoting the display at a predetermined angle;
an arm assembly having first and second ends respectively connected to the hinge assembly and the receiving portion; and
a pivot control unit providing a pivotal force of the arm assembly with respect to the receiving portion, the hinge assembly, arm assembly, and pivot control unit being completely stored within the receiving portion when the display device is received in the receiving portion,
wherein the display device is configured to move up and down while maintaining the display device in a vertical orientation.

14. The refrigerator according to claim 13, wherein the pivot control unit is configured to provide pivotal force to the display device in a direction where the display device is advanced frontward and elevated from the receiving portion.

15. The refrigerator according to claim 13, wherein the pivot control unit is controlled by a cam.

16. The refrigerator according to claim 13, wherein the pivot control unit includes a spring having an end connected to the arm assembly.

* * * * *